United States Patent [19]

Fukutomi et al.

[11]  4,219,927
[45]  Sep. 2, 1980

[54] METHOD OF PRODUCING A MULTISTYLUS HEAD DEVICE

[75] Inventors: Naoki Fukutomi, Yuki; Yoshiyuki Tsuru, Shimodate; Kunio Kawaguchi, Shimodate; Susumu Naoyuki, Shimodate, all of Japan

[73] Assignee: Hitachi Chemical Company, Ltd., Tokyo, Japan

[21] Appl. No.: 938,784

[22] Filed: Sep. 1, 1978

[30] Foreign Application Priority Data

Sep. 2, 1977 [JP] Japan .................................. 52-106188

[51] Int. Cl.$^3$ .............................................. H05K 3/10
[52] U.S. Cl. ..................................... 29/850; 29/852; 346/155; 174/68.5
[58] Field of Search ...................... 29/628, 625, 603; 174/68.5; 346/155, 153; 156/73.1; 427/97

[56] References Cited

U.S. PATENT DOCUMENTS

| 3,646,572 | 2/1972 | Burr | 29/628 X |
| 3,674,602 | 7/1972 | Keogh et al. | 156/73.1 X |
| 3,674,914 | 7/1972 | Burr | 174/68.5 |
| 3,718,936 | 2/1973 | Rice, Jr. | 346/155 |
| 3,808,675 | 5/1974 | Iiyama et al. | 346/155 X |
| 3,876,822 | 4/1975 | Davy et al. | 174/68.5 |
| 3,903,594 | 9/1975 | Koneval | 174/68.5 X |

Primary Examiner—Francis S. Husar
Assistant Examiner—C. J. Arbes
Attorney, Agent, or Firm—Armstrong, Nikaido, Marmelstein & Kubovcik

[57] ABSTRACT

A multistylus head device which comprises a vast plurality of insulated wires embedded in an insulating substrate having through-holes. The present multistylus device is characterized in that the insulated wires have their respective free terminals exposed on one edge of said insulating substrate and disposed in parallel at predetermined equal intervals in close proximity to each other to form electrodes and have their other terminals exposed respectively on the inner walls of said through-holes; and said other exposed terminals of the insulated wires are connected respectively to metal layers electrolessly deposited on the inner walls of the through-holes. The present multistylus head device is compact in size and excellent in reliability of terminal connection and is capable of recording a transmitted information with high density of printing. The exposed disposition of the wires at their respective free terminals in a parallel state at predetermined equal intervals are skillfully realized according to the method of the present invention. Thus, the present device can be produced at low cost, with reliability of the function of the produced device and is suitable for mass-production.

4 Claims, 10 Drawing Figures

METHOD OF PRODUCING A MULTISTYLUS HEAD DEVICE

This invention relates to a multistylus head device and a method of producing the same. More particularly, the present invention is concerned with a multistylus head device for use in a recording section of a facsimile (solid scanning type), a printer, a plotter, a recorder and the like in which recording is effected by a system of electrostatography, electric thermosensitization recording, discharge breakdown recording or the like, and a method of producing such a multistylus head device.

The multistylus head device of this kind, in general, comprises an insulating substrate having on its one edge a plurality of conductors which are exposed and disposed, at their respective free terminals, in parallel at predetermined equal intervals (usually at a concentration of conductors of 4 to 8/mm) to form electrodes and are at the other terminals connected to terminals of other separate circuitry, i.e., a driving circuit.

Known multistylus head devices of the character described above include those in which conductors are formed by etching a copper-clad laminate and those in which insulated wires are used as the conductors.

With respect to the multistylus head devices produced by etching a copper-clad laminate, an etching resist is applied onto the surface of a copper-clad laminate and etching operation is conducted to form a plurality of conductors arranged in parallel at predetermined equal intervals at a conductor concentration of e.g. 4 to 8/mm. Such an etching—produced multistylus head device has the following drawbacks. That is, (1) it is difficult to form precise circuit conductors and therefore, such troubles as disconnection, short circuiting and the like are liable to occur, leading to decrease in yield of good quality products; (2) the cross-sectional areas of the formed circuit conductors are inevitably small and hence, the cross-sectional areas (dot areas) of the exposed terminals of the electrode are naturally reduced, causing the density of printing to be low; and (3) the size of the device tends to be large and the production cost also tends to be high.

On the other hand, for the production of the multistylus head devices of the type in which insulated wires are used as the conductors, there has conventionally been employed, for example, a method in which an insulated wire is wound coilwise over the periphery of a cylindrical substrate of a flexible material, the resulting wire-wound cylindrical substrate is axially cut to expose the cut sections of the insulated wires and the curved flexible substrate is spread out into a flat shape, followed by attaching the opposite ends of the wires to the exposed cut sections (serving as electrodes) of the wires to teminals of other separate circuitry, i.e. a driving circuit, one by one, by soldering. In this conventional method, the soldering operation for attaching the ends of the wires to the terminals of other separate circuitry is complicated and requires not only much time but also a skill in attaining reliable connections by soldering, leading to increase in production cost. Further, due to many soldered connections, the multistylus head device is hardly produced in a compact form.

Accordingly, it is one and a principal object of the present invention to provide a multistylus head device which is compact in size and excellent in reliability of terminal connections and is capable of recording a transmitted information with high density of printing.

It is another object of the present invention to provide a method of producing a multistylus head device of the character described above, which can be easily conducted at low cost and is suitable for mass-production.

The foregoing and other objects, features and advantages of the present invention will be apparent to those skilled in the art from the following detailed description taken in connection with the accompanying drawings in which.

In one aspect of the present invention, there is provided a multistylus head device which comprises:
an insulating substrate having through-holes at preprogrammed positions; and
a vast plurality of insulated wires embedded in said insulating substrate;
said insulated wires having their respective free terminals exposed on one edge of said insulating substrate and disposed in parallel at predetermined equal intervals in close proximity to each other to form electrodes and having their other terminals exposed respectively on the inner walls of said through-holes;
said other exposed terminals of the insulated wires being connected respectively to metal layers electrolessly deposited on the inner walls of the through-holes.

In another aspect of the present invention, there is provided a method of producing a multistylus head device which comprises:

(1) disposing on an insulating substrate a vast plurality of insulated wires, at least at their respective one end portions, at preprogrammed positions and affixing said end portions to said substrate;

(2) arranging on the insulating substrate said vast plurality of insulated wires at their respective preselected portions in parallel at predetermined equal intervals in close proximity to each other and affixing said preselected portions to said substrate simultaneously with or posterior to the affixing of said end portions to the substrate in step (1);

(3) forming, in said substrate at its positions at which said end portions of the insulated wires are located, through-holes traversing crosswise the insulated wires to thereby expose the resulting cut sections of the insulated wires respectively on the inner walls of the through-holes;

(4) electrolessly depositing metal layers respectively on the inner walls of the through-holes to collectively effect connection of said end portions of the insulated wires to the inner walls of the through-holes; and (5) cutting the substrate along the line in which said preselected portions of the insulated wires are disposed in parallel at the predetermined equal intervals to thereby expose free terminals of the insulated wires on the edge of the substrate formed by the cutting, thus forming a vast plurality of electrodes disposed in parallel at the predetermined equal intervals in close proximity to each other.

Figure 1:
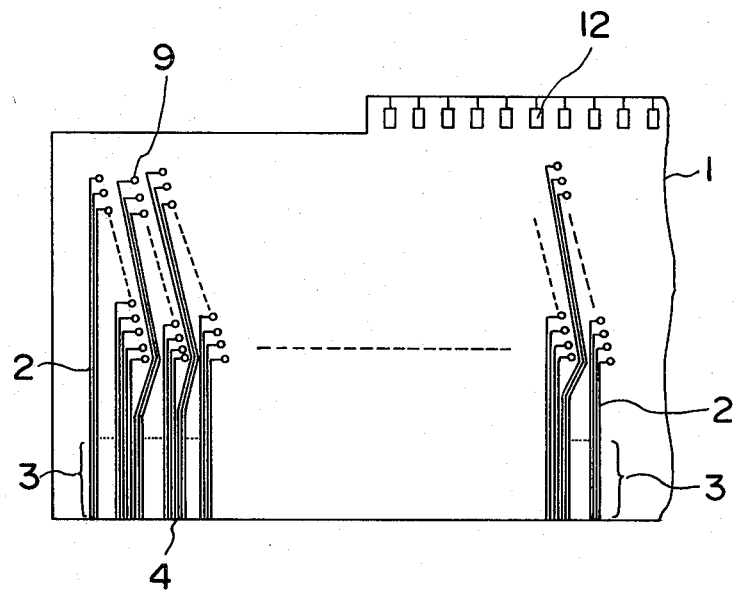
FIG. 1 is a partly cut-away diagrammatic top plan view of a multistylus head device according to the present invention.

Referring now to FIG. 1, there is shown a partly cutaway diagrammatic top plan view of a multistylus head device embodying the present invention. In an insulating substrate 1, there are a vast plurality of insulated wires (hereinafter often referred to simply as "wires") 2 disposed at their respective one end portions 3 in parallel at predetermined equal intervales in close proximity to each other. The wires 2 have their respective free terminals exposed on one edge 4 of the substrate 1 and disposed in parallel at predetermined equal intervals in close proximity to each other. The exposed terminals of the wires 2 form electrodes of the present multistylus head device. In the actual device, the wires 2 are covered by an overlay, and therefore, if the overlay is opaque, the wires are not visible in the plan view. But, for easy understanding of the specific wiring structure of the multistylus head device according to the present invention, the wires are clearly shown in FIG. 1 by way of a schematic view. Further, for clearly showing the positional relationships between the wires 2 and through-holes 9, the wires disposed in the spaces between the schematically shown grouped wires are omitted. The same manner of illustration applies also to some other figures, for example, FIG. 4. Numeral 12 designates contact fingers for electrically connecting the present multistylus head device to other separate circuitry, i.e. a driving circuit, as will be explained later.

Figure 2:
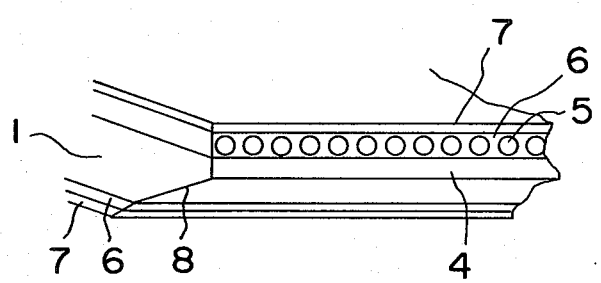
FIG. 2 is a partly cut-away, enlarged diagrammatic perspective view of the device of FIG. 1, illustrating the edge portion where a plurality of insulated conductor wires arranged parallelly at predetermined equal intervals in close proximity to each other are exposed at their respective free terminals.

Referring to FIG. 2, there is shown a partly cutaway, enlarged diagrammatic perspective view of the device of FIG. 1. Numeral 4 designates the edge of the substrate 1, numeral 5 the free terminals of the wires 2, numeral 6 adhesive layers, numeral 7 overlays and numeral 8 a tapered portion of the edge 4 of the substrate 1. The free terminals 5 of the wires are diagrammatically illustrated and actually have their respective insulating coatings (not shown) therearound. As mentioned before, the terminals 5 are disposed in parallel at predetermined equal intervals. They are arranged in close proximity to each other for attaining high density or thick printing, and may often be, at their insulating coatings, in contact with each other. The other terminals of the wires are exposed respectively on the inner walls of the through-holes located at preprogrammed portions and traversing crosswise said wires, and are electrically connected to metal layers electrolessly deposited respectively on the inner walls of the through-holes.

Figure 3:
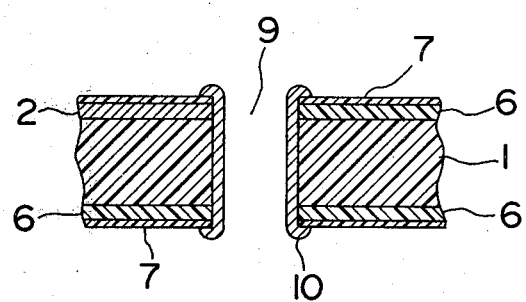
FIG. 3 is an enlarged sectional side view illustrating the structure of a through-hole portion in the device of FIG. 1.

In FIG. 3, there is shown an enlarged sectional side view illustrating the structure of the through-hole portions as mentioned above. Numeral 1 designates the substrate 1, numeral 2 the wire, numeral 6 the adhesive layers, numeral 7 the overlays, numeral 9 the through-hole and numeral 10 a metal (e.g. copper) layer 10 electrolessly deposited on the inner wall of the through-hole. The locations of through-holes are determined taking into consideration such requirements in positional relationships that the distance between the through-holes disposed in adjacent relation be sufficient for electric insulation therebetween, that the disposition of the wires needs a distance therebetween of at least the width of the insulated wire and that the length of the wire to be employed be as short as possible.

Figure 4:
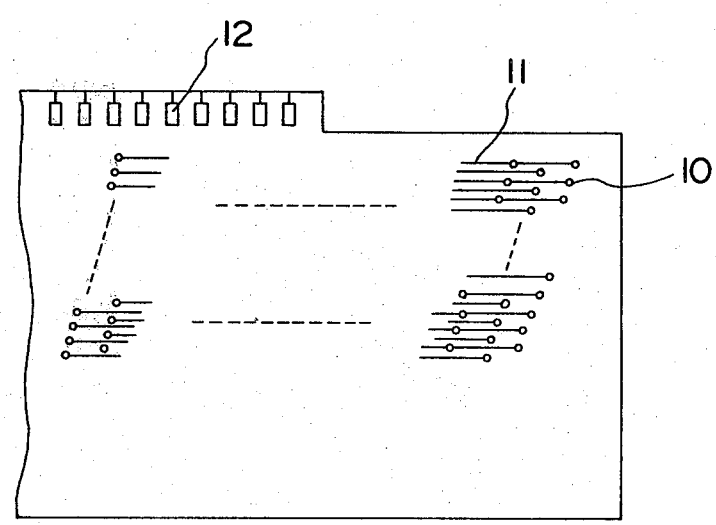
FIG. 4 is a partly cut-away diagrammatic bottom view of the device of FIG. 1, illustrating the manner of wiring in the bottom side with respect to the through-holes.

FIG. 4 shows a partly cut-away diagrammatic bottom view of the device of FIG. 1. The terminal connected to the metal layer 10 of the through-hole is then connected to the contact finger 12 through a circuit conductor 11. The contact finger 12 is adapted to be connected to the driving circuit as explained before.

Figure 5:
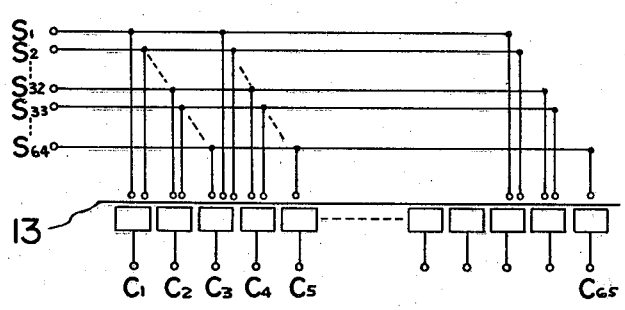
FIG. 5 is a diagram illustrating the manner in which the multistylus head of the device functions as the recording electrodes in a facsimile of Gould type.

Referring to FIG. 5, there is shown a diagram illustrating the manner of driving a Gould type facsimile apparatus in which the present multistylus head device is employed as the recording electrodes. As described in detail in U.S. Pat. No. 3,662,396, the Gould type facsimile apparatus essentially comprises a matrix circuit including, in conbination, primary electrodes and control electrodes. In the Gould type facsimile, portions to be printed are selected according to the combination of primary electrodes and control electrodes. In the matrix circuit of FIG. 5, primary electrodes are designated by $S_1$ to $S_{64}$ and control electrodes are designated by $C_1$ to $C_{65}$. Numeral 13 designates a recording paper. When the control electrodes $C_1$ and $C_2$ are selected, the information signals of the primary electrodes $S_1$ to $S_{32}$ corresponding to the control electrodes $C_1$ to $C_2$ are transmitted through the multistylus head device and electrify the recording paper. Similarly, in order to electrify the paper according to the information signals of the primary electrodes $S_{33}$ to $S_{64}$, the control electrodes $C_2$ and $C_3$ are selected. The manner of combining primary electrodes and control electrodes is determined so that the number of driving circuits therefor may be as small as possible. In the illustrative example of FIG. 5, the number of primary electrodes is 64 while the number of control electrodes is 65. The number of primary electrodes, namely 64, corresponds to the number of wires accommocated in one block of the multistylus head device. The number of primary electrodes is not limited, and is not necessarily 64 as in FIG. 5 illustrating one example of matrix. In the Gould type system, there are in general the following relationships:

$$N_p = LD$$

$$N_p = B/2(N_c - 1)$$

wherein
$N_p$ = number of primary electrode pins
L = width of electrode, mm

D=concentration of electrodes, number of electrodes/mm

B=number of primary electrode pins in one block $N_c$=number of control electrodes As examples of the substrate 1 to be employed in the present invention, there can be mentioned thermoset resin laminates such as a fiber glass-epoxy resin laminate, a paper-epoxy resin laminate, paper-phenolic resin laminate and the like; thermoplastic resin plates such as a polyester plate, a polyimide plate and the like; a ceramic plate; and insulated plates of metal such as iron, aluminum or the like.

As examples of adhesive materials for forming the adhesive layer 6, there may be employed those of a rubber-epoxy resin type, a rubber-phenolic resin type, a rubber-nylon type and the like.

As an example of a material for forming the overlay 7, there may preferably be employed a prepreg produced by impregnating fiber glass cloth with an epoxy resin.

In the insulating substrate 1, adhesive layer 6 and overlay 7, there may be incorporated a catalyst for electroless metal plating such as a precious metal e.g. palladium. With respect to the electroless metal plating technique for the inner wall of the through-holes, there is a detailed description in U.S. Pat. No. 3,646,572 which will hereinafter be referred to again.

Preferred thicknesses of the insulating substrate 1, the adhesive layer 6 and the overlay 7 are 0.2 to 2.0 mm, 0.05 to 0.3 mm and 0.1 to 1.0 mm, respectively.

As the insulated wires 2, there may generally be employed copper wires coated by an insulating material such as a polyimide, a polyamide-imide, an epoxy resin, a polyurethane, a polyamide or a polyester amide. The diameter of the naked copper wire may preferably be in the range of 0.04 to 0.2 mm, and the diameter of the insulated wire may preferably be in the range of 0.05 to 0.25 mm. In addition, it is noted that the insulated wire may be peripherally coated with an adhesive material at a thickness of about 5 to 50μ. Such adhesive materials include those of a rubber-epoxy resin type, a rubber-phenolic resin type, a rubber-nylon type, a phenolic resin-nylon type, a polyvinyl butyral type or the like. The use of such an adhesive-coated wire is advantageous because in practicing disposition of the wires in parallel, for example, in contact with each other (at portions 3 in FIG. 1) the working can be simply conducted.

With respect to formation of through-holes and electroless deposition of a metal on the inner walls of the through-holes, there may be employed the techniques which are generally employed in the production of printed circuit boards utilizing electroless metal deposition. The inner diameter of the through-holes may preferably be in the range of about 0.3 to 1.2 mm.

On the bottom side of the insulating substrate 1, there are also disposed insulated wires 11 in parallel (as is seen in FIG. 4) by the multi-wiring method as will be explained later. On the bottom side also, there are formed an adhesive layer 6 and an overlay 7.

Figure 6:
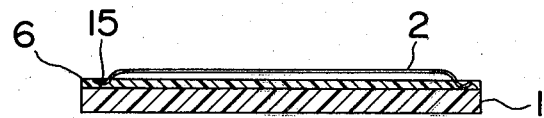
FIG. 6 is a side view illustrating the manner of wiring in the production of a multistylus head device according to the present invention, with the substrate shown in cross-section.
Figure 7:
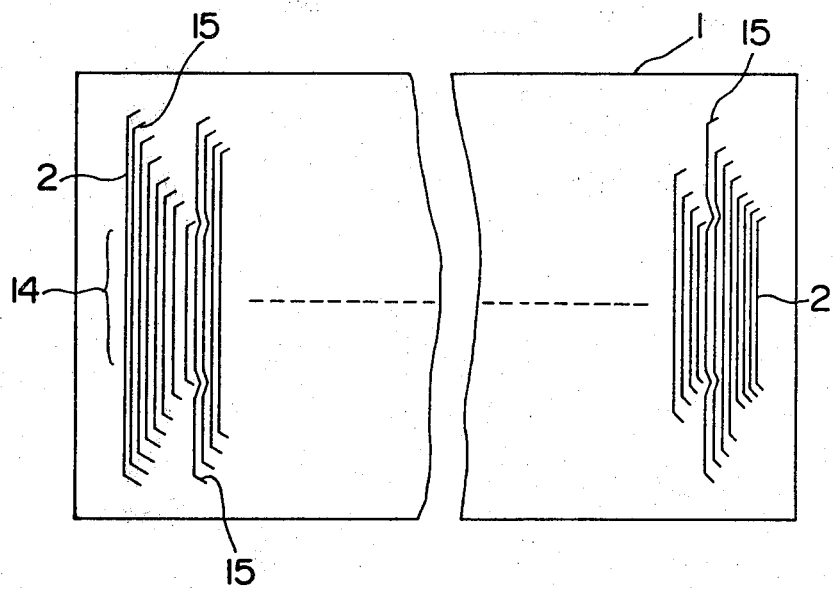
FIG. 7 is a partly cut-away diagrammatic plan view further illustrating the manner of wiring as shown in FIG. 6.
Figure 8:
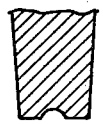
FIG. 8 is an enlarged sectional side view of a tacking head to be employed as the wiring tool in the production of a multistylus head device according to the present invention.

Referring to FIGS. 6 and 7, there is shown the manner of wiring on the substrate 1. FIG. 6 is a side view, with the substrate shown in cross-section, and FIG. 7 is a partly cut-away diagrammatic plan view. In the method of producing a multistylus head device according to the present invention, there can be effectively utilized the so-called multi-wiring method which is described in detail in U.S. Pat. Nos. 3,646,572; 3,674,602 and 3,674,914. Essentially, according to the above-mentioned multi-wiring method, the insulated wire coated with e.g. a heat resistant polyimide resin is laid down, on an insulating substrate having thereon a thermosetting adhesive layer retaining a thermoplastic property, by the use of a numerical control type multi-wiring machine, and affixed onto the surface of the substrate by pressing or the like. Through-holes are then formed in the wired substrate at its positions at which the end portions of the wires are located, in such a manner that the through-holes traverse and cut the wires to thereby make the resulting cut sections of the wires exposed on the inner walls of the through-holes. On the inner walls of the through-holes are formed metal layers deposited electrolessly, thereby accomplishing connection of the terminals of the wires to the inner walls of the through-holes. In practicing the multi-wiring method, the affixture of a wire onto the substrate is attained by pressing onto the substrate having thereon an adhesive material layer the wire by means of a tacking head with its U-shaped opening (as shown in FIG. 8) by which the wire is caught therein, and energizing the tacking head to cause supersonic vibration thereof so that the adhesive material is heat-fused for affixing thereto the wire.

According to the method of the present invention, (1) wires are disposed, at least at their respective one end portions, on the substrate at preprogrammed positions and affixed at said end portions thereof to the substrate; and (2) the wires are arranged at their preselected portions in parallel at predetermined equal intervals in close proximity to each other and affixed at said preselected portions to the substrate simultaneously with or posterior to the affixing of said end portions of the wires to the substrate in the step (1). Subsequently, as mentioned above, (3) through-holes are formed in the wired substrate at its positions at which at least one end portions of the wires are located so that the end portions of the wires are traversed and cut by the inner walls of the through-holes for making the resulting cut sections of the wires exposed on the inner walls of the through-holes; (4) the inner walls of the through-holes are plated with electroless metal to connect said end portions of the wires to the through-holes; and (5) the wired substrate is cut along the line in which said preselected portions of the wires are affixedly disposed in parallel at predetermined equal intervals [in the step (2)] to thereby expose free terminals of the wires on the edge of the substrate formed by cutting, thus forming a vast plurality of recording electrodes disposed in parallel at the predetermined equal intervals in close proximity to each other.

In practicing the method of the present invention, when in the step (1) the wires are affixedly disposed only at their respective one end portions, the preselected portions of the wires to be affixedly disposed in parallel at predetermined equal intervals [in the step (2)] mean the other end portions of the wires. In such case, only one piece of multistylus head device is produced by one operation of the method. On the other hand, when in the step (1) the wires are affixedly disposed at their respective both end portions, the preselected portions of the wires to be affixedly disposed in parallel at predetermined equal intervals [in the step (2)] mean the substantially central portions of the wires. In this latter case, a pair of pieces of multistylus devices can be produced by one operation of the method. The following explanation will be made with reference to the latter case.

In FIG. 6, a substrate 1 has thereon an adhesive material layer 6. The wire 2 is embedded at its both ends in the adhesive material layer 6 through heat-fusion of the adhesive material by supersonic vibration of a tacking head as described above with reference to FIG. 8. The movement of the moving tacking head relative to the surface of the substrate is automatically determined by numerical control of the numerical control type multi-wiring machine, and a vast plurality of wires are affixedly disposed at their respective both end portions according to predetermined programming. As is seen in FIG. 7, wiring is accomplished in symmetry with respect to the central portion 14 in which the wires are disposed in parallel at predetermined equal intervals in close proximity to each other so that when the wired substrate is cut along the line shown in a broken line there are obtained a pair of pieces or boards of multistylus head devices. In the above-mentioned step of affixedly disposing the wires, the wires 2 are affixed to and embedded in the adhesive material layer of the substrate only at portions 15 in which through-holes will be formed later, while leaving in a free state the intermediate portions which will be disposed in parallel at predetermined equal intervals in close proximity to each other. In other words, the wires are affixedly attached at their both end portions to the surface of the substrate 1 at its preprogrammed positions, while the intermediate portions of the wires are disposed leaving a little spacing from the surface of the substrate.

The tacking head employed in a numerical control type multi-wiring machine generally has a shape in vertical cross-section as shown in FIG. 8 and the width of the bottom edge of tacking head is usually about 0.5 mm. Therefore, by the use of such a tacking head, it is difficult to dispose wires in parallel at a concentration of about 8 wires per a space of 1 mm because the edge portion of the tacking head tends to damage the already adjacently desposed insulated wires or interfere with the wires. For this reason, it is in general difficult to effect precise wiring at a concentration of more than 1,000 wires per space of about 200 mm, but since the through-holes have a diameter of about 1 mm, affixed disposition of the wires at their respective end portions to the substrate at its positions 15 at which through-holes are to be formed can be easily conducted by a numerical control type multi-wiring machine generally employed. Thus, there is obtained a wired substrate in which each of the wires is affixedly disposed at each of its end portions to the surface of the substrate at its positions at which through-holes will be formed later and the wires are freely disposed, at their respective intermediate portions, leaving a little space from the surface of the substrate.

To the freely disposed portions intermediate the affixedly attached both ends of the wires on the wired substrate is applied a tension or stretching force in the longitudinal direction of the wires. According to the tension applied to the wires, the wires are stretched in the longitudinal direction so that the wires are forcibly arranged in parallel in a predetermined order. The wires are then affixedly attached, by means of an adhesive material, to the substrate at its portion 14 at which the intermediate portions of the insulated wires are arranged forcibly in parallel in contact with each other. The stretching of the wires in their respective longitudinal directions can be effected by slightly bending the substrate with its wired surface being desposed in a convex state. Alternatively, when the wires are affixed disposed to the substrate, two separate substrates placed in opposite relation are employed in place of the single substrate and both ends of the wires are affixed to the two separate substrates, respectively, after which if the two separate substrates are drawn apart from each other, the wires are forcibly stretched across the spacing between the two separate substrates. The latter method is useful especially when a substrate of rigid material which is difficult to bend, e.g. a ceramic substrate, is used. As a further alternative method for applying a tension over the length of the intermediate portion of wire, there is employed a method in which a bar is inserted between the wires and the substrate so that the wires are slightly raised from the surface of the substrate.

Figure 9:
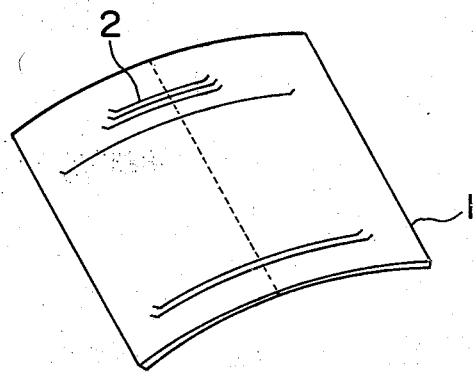
FIG. 9 is a diagrammatic perspective view illustrating the substrate which is slightly bent for applying tension to the wires which have been affixed, at their respective both end portions, to the substrate.

As a representative example, there is shown FIG. 9 in which the substrate is slightly bent so that the wires are stretched in the longitudinal directions thereof and are forced to be arranged in parallel. In this instance, it is preferable to manually amend disposition of the wires using, for example, a spatula-like tool so that the arrangement of the wires are made precisely in parallel. In this parallelly arranged state, as mentioned before, the wires are affixed, at their portions 14 shown in FIG. 7, to the surface of the substrate.

The slightly bent substrate is recovered to the original flat state. The wired substrate has thereon wires densely arranged and therefore, formation of through-holes on the thus wired substrate in situ is difficult. For this reason, in order to secure locations for forming therein through-holes, the wires passing over locations at which through-holes are to be formed are displaced out of the locations for through-holes and bound into a bundle. The step for formation of through-holes may be conducted either before or after the step for disposing the intermediate portions of the wires in parallel at predetermined equal intervals in close proximity to each other. For easy understanding the manner of such displacement of the wires, in FIG. 10 there is schematically shown a state in which the intermediate portions of the wires are, end to end, entirely displaced (in most cases of the practice of the method of the present invention, the step of displacement of the interferring wires with the locations for through-holes is effected after the step of disposing the intermediate portions of the wires in parallel and affixing them to the substrate).

Figure 10:
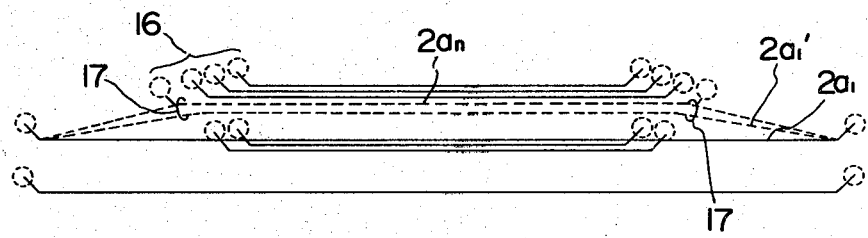
FIG. 10 is a diagrammatic view illustrating the manner of wire grouping employed for actual wiring according to the present invention.

Referring to FIG. 10, the wires are densely disposed and affixed at their respective both end portions to the substrate and therefore, a group of wires have their freely disposed portions passing over the locations 16 for through-holes to which the preceding group of wires are to be connected so that formation of through-holes for the preceding group of wires cannot be effected from a positional point of view (if the succeeding group of wires are so disposed that they may do not pass over the locations for through-holes for the preceding group of wires, additional spacing is needed in a lateral direction, leading to increase in size of the multistylus device produced). For this reason, for example, a group of wires $2a_1$ to $2a_n$ are collectively displaced to the position of $2a_1'$ to $2a_n$ and bound at 17 to expose the locations for through-holes for the preceding group of wires so that the through-holes for the preceding group of wires can be easily formed [in FIG. 10 the displaced wire $2a_1'$ assumes one circular arc, but since in most cases of the present invention the displacement of the wires is conducted after the step of disposing and affixing the wires at their central portions (corresponding to the portion 14 in FIG. 7), the wire $2a_1'$ assumes two circular arcs, with the central portion of $2a_1'$ being not displaced from the central portion of $2a_1$ in situ].

The wires disposed on the surface of the substrate is entirely covered by an overlay of thermosetting resin material and securely set. Through-holes are formed in the substrate at its positions at which the both end portions of the wires are located in such a manner that they traverse and cut the end portions of the wires to thereby expose the resulting cut sections of the wires on the inner walls of the through-holes, respectively. The inner walls of the through-holes are plated with electroless metal to electrically connect the wires to the through-holes.

The completely wired substrate is cut, at its central portion 14, along the line along which the insulated wires are disposed in parallel at predetermined equal intervals in close proximity to each other (in most cases, in contact with each other), so that the free terminals of the parallelly disposed wires are exposed on the edge of the substrate to form recording electrodes. Thus, there are produced two pieces of multistylus head devices according to the present invention.

The following explanation will be given for illustrating the manner of precisely disposing the wires at their intermediate portions in parallel at predetermined equal intervals in close proximity to each other in a short time. The number of the wires required for the multistylus head device of the present insention is determined depending on the width of a recording electrode (namely, a wire) and the concentration of wire. Usually, there are employed 32 blocks of wires which each include 64 wires, and therefore, the number of wires are as many as $64 \times 32 = 2,048$. In wiring, as described with reference to FIG. 6, the wires 2 are affixed only at their respective both end portions to the substrate at preprogrammed positions at which through-holes are to be formed, while the intermediate portions are freely disposed leaving little spacings from the surface of the substrate 1. In this instance, before wiring, the wires are preliminarily grouped into an appropriate number of units which each include, for example, 16 wires, and the units are disposed every other unit space. Illustratively stated, units of wires are first disposed on the substrate, leaving on both adjacent sides thereof spacings respectively for receiving two units of wires. Such units of wires are then applied with tension to thereby cause the wires of the respective units to be forcibly arranged in parallel at predetermined equal intervals in proximity to each other and then secured to each other in situ. Next, the remaining spacings are wired with other units of wires, respectively, and tension is applied to each of the wires of the units to thereby cause the wires of the respective units to be forcibly arranged in parallel as mentioned above and then secured to each other in situ. The thus formed vast plurality of conductor wires disposed in parallel and secured to each other are embedded in the substrate and affixed thereto by an adhesive material.

The above-mentioned procedures are further explained in greater detail as follows.

(1) Onto the central portion 14 of the adhesive-coated substrate in which wires are to be arranged in parallel, a strip of release film such as Teflon film is securely laid.

(2) Units of wires (e.g. 16 wires) are disposed and affixed at their both ends onto the substrate at its preprogrammed positions by a numerical control type multi-wiring machine so that they are disposed, at their intermediate portions, over the release film every other unit space, leaving, on both sides of each of the units, spacings for receiving other units of wires.

(3) The substrate is dismounted from the wiring machine and is slightly bent, with the wired surface being disposed in a convex state, to thereby apply tension to the wires so that the wires are arranged precisely in parallel. The working of this arrangement of the wires can be easily done because there are spacings on the both sides of the unit of wires. If there are not such spacings, the working of the wire arrangement is complicated and needs much time.

(4) The wires of the units arranged in parallel are secured to each other by means of an instantaneous adhesive material unit by unit. By the securing operation, the wires are attached to each other but not to the substrate because there is a release film between the wires and the substrate.

(5) Onto the wires disposed by the procedures (1) to (4) above, another release film is securely laid in the central portion of the substrate.

(6) In the spacings left in the procedures (2) to (4) above, other units of wires (each unit including 16 wires) are disposed and the wires of each unit are secured to each other in the same manner as described in the procedures (2) to (4) above.

(7) The second release film laid on the first disposed wires in the procedure (5) above is removed, and both of the first disposed wires and the second disposed wires are rearranged over the first release film laid in the procedure (1) above so that the wires are entirely disposed, at their central portions, precisely in parallel and secured to each other in situ. In this instance, since the wires are prearranged by a unit of 16 wires, the rearrangement of the entire wires in parallel disposition can be easily accomplished.

(8) The first release film laid in the procedure (1) is removed and the entire wires are heat-pressed to the adhesive material layer of the substrate and fixedly attached thereto.

The following examples are given only by way of example but not limiting the scope of the present invention.

EXAMPLE 1

There was employed an insulated copper wire (core diameter 0.10 mm; insulating coat polyimide resin layer of 0.0125 mm; outer diameter 0.125 mm). As shown in FIG. 7, the wire was disposed on the substrate. In wiring, there were employed a wire pitch (distance between the axis of the wire and that of the adjacent wire) of 0.125 mm and a hole pitch (distance between the center of through-hole and that of the adjacent through-hole) of 2.0 mm. The wires were freely disposed except portions located within a distance of 2.54 mm from the centers of through-holes.

As the substrate, there was employed a 1.6 mm-thick MCL-E-161 (a trade name of a copper-clad fiber glass-epoxy resin laminate produced and sold by Hitachi Chemical Company, Ltd.). As the adhesive material, there was employed HA-05 (a trade name of a rubber-phenolic resin type adhesive material produced and sold by Hitachi Chemical Company, Ltd.). In both of the substrate and the adhesive, there is incorporated a Pd-Sn type catalyst for electroless plating. The adhesive material is heat-pressed onto the substrate at 150° C. under 14 Kg/cm$^2$ for 10 minutes and then cooled to room temperature.

After prewiring as mentioned above, the prewired substrate was slightly bent and the wires were arranged at their central portions in parallel and in contact with each other. The parallely arranged wires were heated by means of a rod-shaped heater to affix the wires to the substrate. The slightly bent substrate was recovered to a flat shape, and the groups of wires passing over the locations for through-holes for the respective adjacent groups of wires were displaced out of the locations and bound into bundles.

Onto the entire surface of the completely wired substrate was laminated a 0.1 mm-thick GEA161 (a trade name of a fiber glass-epoxy resin type prepreg produced and sold by Hitachi Chemical Company, Ltd.), followed by heat-pressing to effect curing thereof. Onto the entire surface of the prepreg layer was attached a polyethylene film having a tacking face by heat-pressing to form a plating resist mask.

Through-holes having a diameter of 0.8 mm were formed, at preprogrammed positions, in the thus formed substrate incorporating therein conductor wires, using a numerical control type perforating machine. The inner walls of the through-holes were washed with an aqueous alkaline solution, and were plated with electroless copper at a thickness of 40μ. The polyethylene film was then removed. The thus treated substrate was cut along the line along which the wires were disposed in parallel to make the cut sections of the wires exposed on the edge of the substrate. The exposed free terminals of the wires were polished with a sand paper (# 1000) to obtain a multistylus head device. The thus obtained device had a wire concentration of 8 wires per spacing of 1 mm and exhibited good recording characteristics.

EXAMPLE 2

There was employed an insulated copper wire (core diameter 0.12 mm; insulating coat polyimide resin layer of 0.020 mm; outer diameter 0.16 mm). As shown in FIG. 7, the wire was disposed on the substrate. In wiring, there were employed a wire pitch of 0.16 mm and a hole pitch of 2.0 mm.

Substantially the same procedures as described in Example 1 were repeated to obtain a multistylus head device. The thus obtained multistylus head device had a wire concentration of 6 wires per spacing of 1 mm and exhibited good recording characteristics.

EXAMPLE 3

As a substrate, there was employed a 1.6 mm-thick MCL-E-161 (a trade name of a copper-clad fiber glass-epoxy resin laminate produced and sold by Hitachi Chemical Company, Ltd.). As an adhesive material, there was employed HA-05 (a trade name of a rubber-phenolic resin type adhesive material produced and sold by Hitachi Chemical Company, Ltd.). In both of the substrate and the adhesive, there was incorporated a Pd-Sn type catalyst for electroless plating. The adhesive material is heat-pressed onto the substrate at 150° C. under 14 Kg/cm$^2$ for 10 minutes and then cooled to room temperature over 15 minutes.

There was employed an insulated copper wire (core diameter 0.08 mm; insulating coat polyimide resin layer of 0.02 mm; outer diameter 0.120 mm). As shown in FIG. 7, the wire was disposed on the substrate. In wiring, there were employed a wire pitch of 0.125 mm and a hole pitch of 2.0 mm. The wires were freely disposed except portions located within a distance of 2.54 mm from the centers of through-holes.

The number of wires were 32 per block. The block pitch (length of each of repeating blocks) was 4 mm and the number of blocks was 64. Thus, the total number of the free terminals of wires exposed on the edge of the substrate was 2,048.

Wiring was conducted according to the following procedures.

(1) Onto the central portion of the adhesive-coated substrate in which wires would be arranged in parallel, a strip of release film made of Teflon was securely laid.

(2) Units of wires each consisting of 16 wires which were every left halves of 64 blocks each consisting of 32 wires were disposed and affixed at their both ends onto the substrate at its above-mentioned preprogrammed positions by a numerical control type multi-wiring machine so that they were disposed, at their intermediate portions, over the release film every other unit space, leaving, on both adjacent sides of each of the units, spacings for receiving other units of wires.

(3) The substrate was dismounted from the wiring machine and was slightly bent, with the wired surface being disposed in a convex state, to thereby apply tension to the wires, and the wires were arranged precisely in parallel with the aid of a spatula-like tool. The working of this arrangement of the wires could be easily done because there were spacings on the both sides of the unit of wires.

(4) The wires of the units arranged in parallel were secured to each other by means of ARON ALPHA (a trade name of an instantaneous adhesive material produced and sold by Toa Gosei Kagaku K. K., Japan) unit by unit. By the securing operation, the wires were attached to each other but not to the substrate because there was the release film of Teflon between the wires and the substrate.

(5) Onto the wires disposed by the procedures (1) to (4) above, another release film made of Teflon was securely laid in the central portion of the substrate. In the spacings left in the procedures (2) to (4) above, other units of wires each consisting of 16 wires which were every right halves of the 64 blocks were disposed and the wires of each unit were secured to each other in the same manner as described in the procedures (2) to (4) above.

(6) The second release film laid on the first disposed wires in the procedure (5) above was removed, and both of the first disposed wires and the second disposed wires were rearranged over the first release film laid in the procedure (1) above so that the wires were entirely disposed, at their central portions, precisely in parallel and secured to each other in situ. In this instance, since the wires had been prearranged by a unit of 16 wires, the rearrangement of the entire wires in parallel disposition could be easily accomplished.

(7) The first release film laid in the procedure (1) was removed and the entire wires were heat-pressed to the adhesive material layer of the substrate and fixedly attached thereto.

(8) The groups of wires passing over locations for through-holes for the respective adjacent groups of wires were displaced out of the locations and bound into bundles.

Onto the entire surface of the completely wired substrate was laminated a 0.1 mm-thick GEA 161 (a trade name of a fiber glass-epoxy resin type prepreg produced and sold by Hitachi Chemical Company, Ltd.), followed by heat-pressing to effect curing thereof. Onto the entire surface of the prepreg layer was attached a polyethylene film having a tacking face by heat-pressing to form a plating resist mask.

Through-holes having a diameter of 0.8 mm were formed, at preprogrammed positions, in the thus formed substrate incorporating therein conductor wires, using a numerical control type perforating machine. The inner walls of the through-holes were washed with an aqueous alkaline solution, and were plated with electroless copper at a thickness of 40μ. The polyethylene film was then removed. The thus treated substrate was cut along the line along which the wires were disposed in parallel to make the cut sections of the wires exposed on the edge of the substrate. The exposed free terminals of the wires were polished with a sand paper (#1500) to obtain a multistylus head device. The thus obtained device had a wire concentration of 8 wires per spacing of 1 mm and exhibited good recording characteristics.

What is claimed is:

1. A method for producing a multistylus head device which comprises:
    (1) disposing on an insulating substrate a plurality of insulated wires at preprogrammed positions, and affixing each of said wires at its end portions to an adhesive material layer formed on said substrate, leaving the intermediate portions of the wires freely spaced from the surface of the adhesive material layer on the substrate, and applying a tension to said wires in their respective longitudinal directions to arrange said wires in parallel at predetermined equal intervals in close proximity to each other;
    (2) affixing said wires at their respective central portions to said adhesive material layer on the substrate, followed by fixedly securing the entire wires to the substrate by means of an overlay attached onto the surface of the adhesive material on the substrate;
    (3) forming, in said substrate at its positions in which said end portions of the insulated wires are located, through-holes traversing crosswise the insulated wires, to thereby expose the resulting cut sections of the insulated wires respectively on the inner walls of the through-holes;
    (4) electrolessly depositing metal layers respectively on the inner walls of the through-holes to collectively effect connection of said end portions of the insulated wires to the inner walls of the through-holes; and
    (5) cutting the substrate along a line in which the insulated wires are disposed in parallel at their respective central portions to expose free terminals of the insulated wires on the edge of the substrate formed by the cutting, thus forming a plurality of electrodes disposed in parallel at the predetermined equal intervals in close proximity to each other.

2. A method according to claim 1 wherein: in the step (1);
    (a) said wires are grouped into a predetermined number of units and preselected units of wires are disposed, leaving, on both adjacent sides of the respective disposed units, spacings respectively for receiving additional units of wires;
    (b) the disposed wires are applied with tension in the respective longitudinal directions, to forcibly arrange the wires in parallel and in contact with each other and are secured to each other by means of an adhesive material;
    (c) the spacings left in the step (a) are disposed with other units of wires, the disposition of other units of wires being conducted without interference with adjacent units of wires disposed; and
    (d) the wires disposed in the step (c) are applied with tension in the respective longitudinal directions to forcibly arrange the wires in parallel and in contact with each other and are secured to each other by means of an adhesive material;
    whereby the plurality of insulated wires are disposed in parallel in contact with each other.

3. A method according to claim 2 wherein:
    in the step (a) the wires are disposed on a release film securely laid on the adhesive material layer; and in the step (c) the wires of other units are disposed on an additional release film securely laid over the wires disposed in the step (a).

4. A method according to claim 1 wherein: in the step 1 the tension is applied to the wires by bending the substrate, with the wired surface of the substrate being disposed in a convex state.

* * * * *